UNITED STATES PATENT OFFICE.

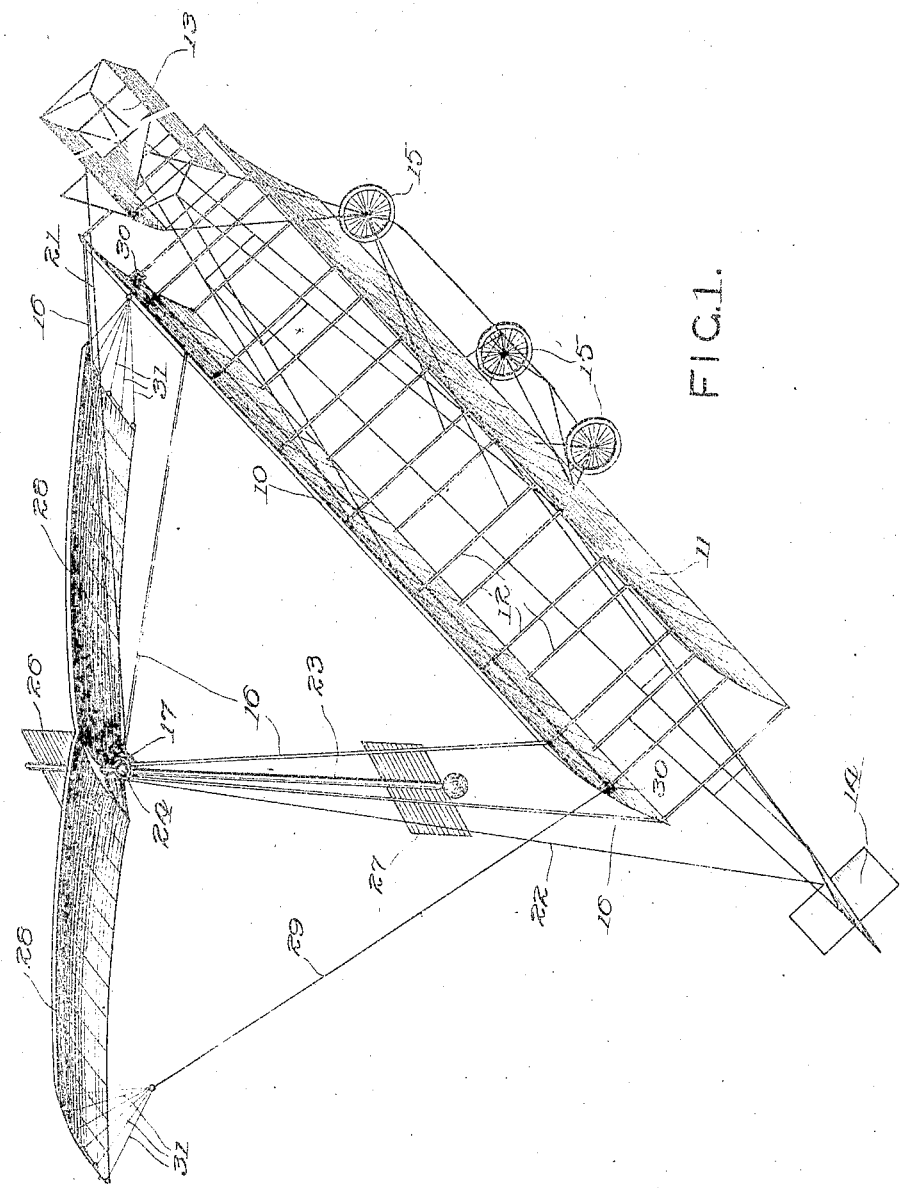

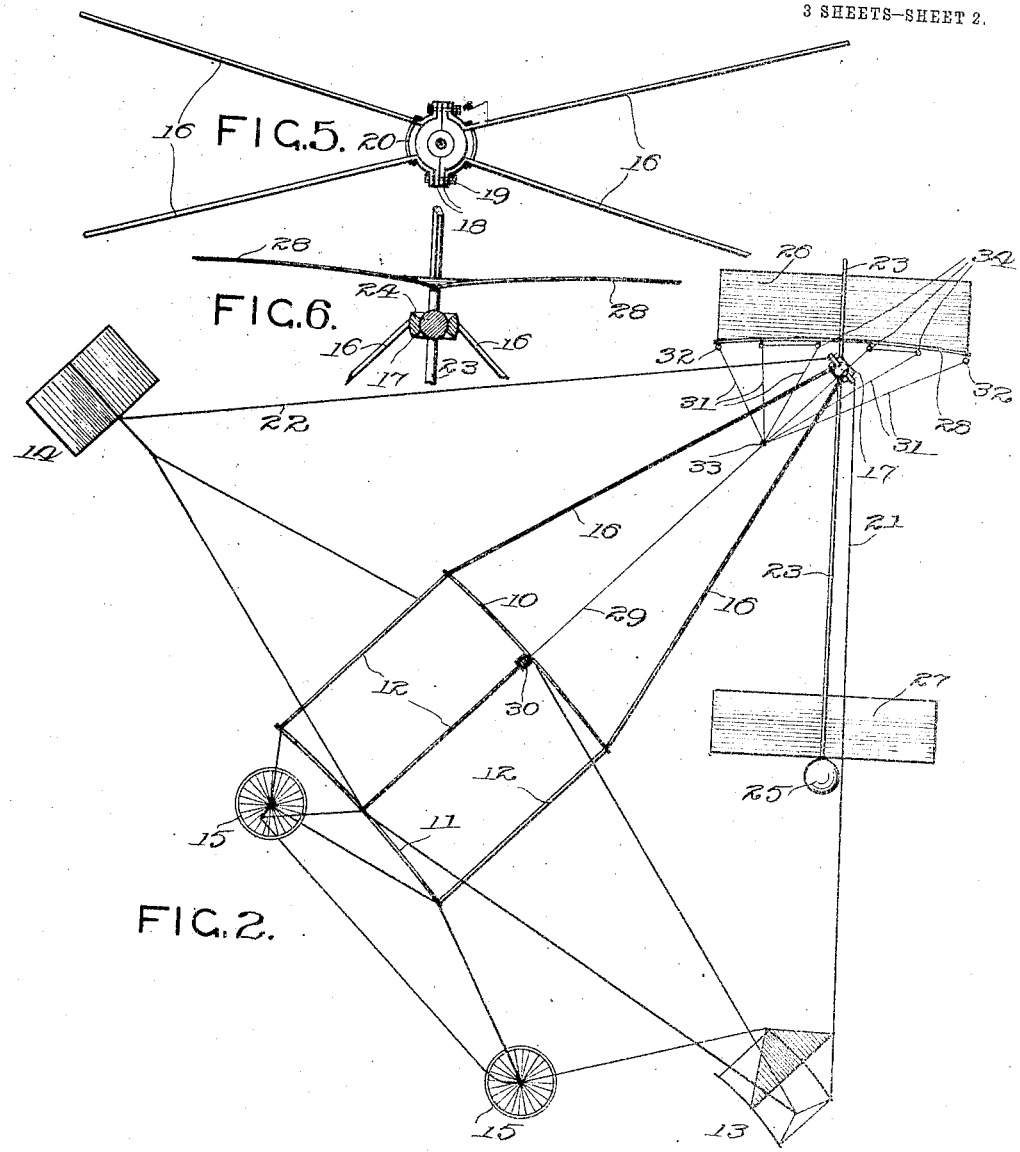

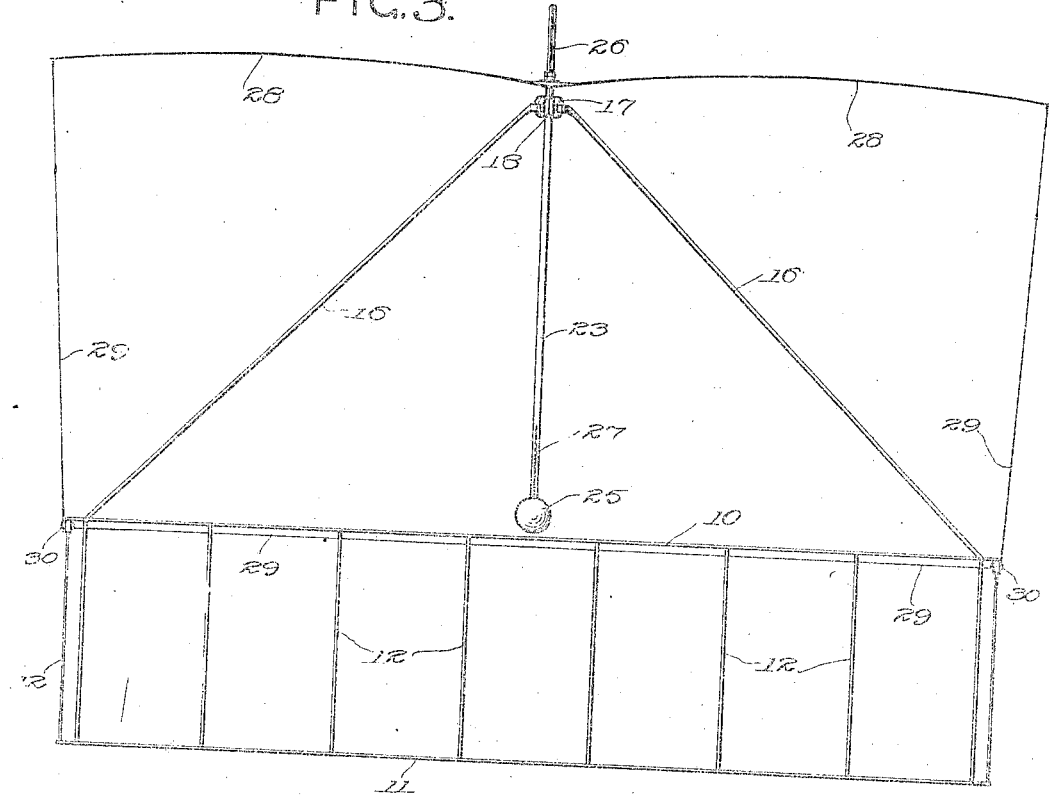
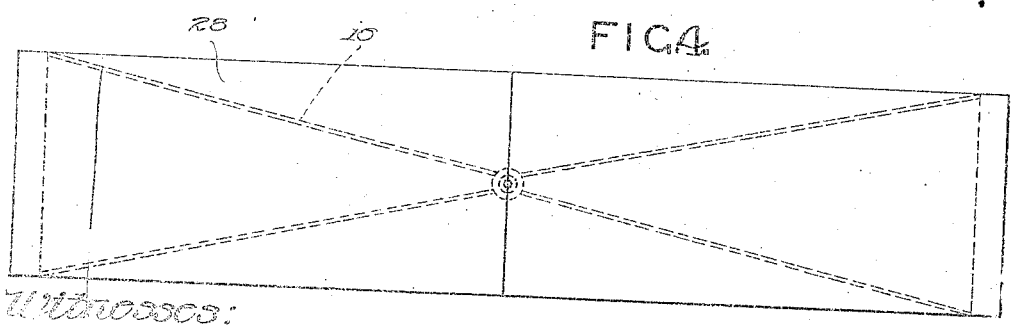

THOMAS A. T. YERNESS, OF CHICAGO, ILLINOIS.

SAFETY DEVICE FOR AIRSHIPS.

1,100,277.

Specification of Letters Patent. Patented June 16, 1914.

Application filed September 7, 1912. Serial No. 719,181

*To all whom it may concern:*

Be it known that I, THOMAS A. T. YERNESS, a subject of the King of Norway, residing in Chicago, in the county of Cook and State of Illinois, United States of America, have invented certain new and useful Improvements in Safety Devices for Airships, of which the following is a specification.

This invention relates to aerial navigation and contemplates the production of means adapted to be applied to airships to prevent them from falling too rapidly in case of an accident, or if the operator should lose control of his machine.

Briefly stated, the invention contemplates a wing or plane adapted to be attached to the airship, and means for at all times holding the said plane in a substantially horizontal position so that if the aeroplane should descend too rapidly, as by reason of it having tipped either endwise or sidewise, the sustaining plane will act as a check on account of its riding upon the air to prevent the airship from plunging toward the earth at a dangerous speed. The operator in many cases will thus be given time to right his machine and gain control thereof.

In the accompanying drawings, Figure 1 is a perspective view of an aeroplane equipped with means embodying the features of my invention, said view showing the aeroplane tipped sidewise. Fig. 2 is an end elevation of the machine showing it tipped forwardly. Fig. 3 is a front elevation with parts omitted. Fig. 4 is a top plan view. Figs. 5 and 6 are respectively a sectional plan view and a vertical section through the universal support for the stabilizer plane.

I have herein shown my invention as applied to a biplane, but it should be understood that the invention is equally applicable to monoplanes and other styles of airships.

In the drawings, 10 and 11 indicate the upper and lower wings respectively of a biplane, 12 being the vertical braces connecting the planes. The forward steering device is indicated by the numeral 13 and the rear steering device by 14.

15 are the supporting wheels.

I have not herein shown the operating mechanism of the aeroplane, inasmuch as the present invention does not relate thereto.

The safety device is mounted upon the upper side of the machine and comprises a suitable rigid supporting frame consisting in this instance of four diagonally disposed brace rods 16 converging upwardly toward a point above the center of the aeroplane. The upper ends of these brace rods are fixed together and to a universal bearing ring or socket 17, the latter being disposed horizontally.

Referring to Figs. 5 and 6, the bearing ring may be conveniently made in two halves having oppositely disposed ears 18 adapted to be clamped together by bolts 19. The upper ends of the brace rods 16, in the present instance, are fitted about the bearing ring 17 and have their ends lying alongside the ears 18, the bolts 19 passing through said brace ends.

20 are tie-bolts securing pairs of the adjacent brace rods together. If desired stays 21 and 22 may be provided, said stays running from the bearing ring 17 to the front and rear steering means 13 and 14, respectively. A vertically disposed rod 23 has a ball 24 fixed thereon near its upper end, said ball fitting in the bearing ring 17 so that the rod may swing freely. The lower end of the rod 23 carries a weight 25 of suitable size.

26 and 27 are small planes carried by the upper and lower ends of the rod 23, respectively, and disposed in a direction from front to rear of the aeroplane. A stabilizing plane 28, which may be of substantially the same length as the planes of the airship is rigidly secured with relation to the swinging rod 23. In the present instance this plane is shown as secured to the lower edge of the upper plane 26. The outer ends of the stabilizing plane 28 are connected with the ends of the aeroplane by means permitting free movement between the stabilizing plane and the aeroplane. This means, in the present instance, comprises a cable or rope 29 running beneath the top plane 10 of the airship and through sheaves 30 mounted thereon, the ends of said cable extending upwardly and being suitably attached to the stabilizing plane 28. Preferably this attaching means comprises a cable 31 having its ends secured at 32 (Fig. 2) to the corners of the plane 28, and running back and forth through an eye 33 on the end of the cable 29 and a suitable number of eyes 34 on the plane 28. Such a connection as this provides free adjusting movement of the stabilizing plane with respect to the aeroplane when the latter tips (see Fig. 2). Gravity acting upon the weight 25 maintains the rod 23 at all times in a substantially vertical position. Therefore the stabilizing plane 28 is maintained in a horizontal position. In case the aeroplane should tip either sidewise or endwise at an abnormal angle and should start to plunge downwardly, the stabilizing plane 28 which will always remain horizontal would be cushioned and buoyed upwardly by the air so as to check the fall of the aeroplane, thus perhaps giving the operator a chance to right his machine.

I recognize that various changes in the construction of the device may be made without departing from the scope of the invention and I therefore do not limit myself to the exemplary embodiment herein shown.

I claim as my invention:

1. A stabilizing device for airships comprising a suitable support, a bearing socket carried thereby, a vertical rod extending through said socket, a ball fixed on said rod and fitting in said socket, a weight fixed on said rod below said socket, and a horizontal stabilizing plane carried by said rod.

2. The combination with an aeroplane, of a sustaining plane universally mounted at its mid-portion on the upper side of the aeroplane for relative tilting movement, means operable by gravity for automatically maintaining said sustaining plane in operative position, and a flexible connection between the ends of said sustaining plane and the aeroplane.

3. The combination with an aeroplane, of a frame mounted on the upper side thereof, a stabilizing plane disposed horizontally above said frame, a universal connection between the central point of said stabilizing plane and said frame, sheaves on the aeroplane, a cable running around said sheaves and having its ends connected with the ends of said stabilizing plane, and a weight depending from said universal connection and rigid with said stabilizing plane, said weight operating to maintain said stabilizing plane in a horizontal position.

4. The combination with an airship, of a frame mounted on the upper side thereof, a universal joint positioned in the upper part of said frame centrally of the airship, a vertically disposed weighted rod mounted in said joint, and a horizontal stabilizing plane rigidly secured to said rod above said frame and said joint.

5. The combination with an aeroplane, of a horizontal sustaining plane positioned above and approximately coextensive with the planes of the aeroplane, means providing a universal connection between the aeroplane and the central point of said sustaining plane, and a weighted rod rigid with said sustaining plane and arranged to automatically maintain said plane at all times in an approximately horizontal position.

6. The combination with an aeroplane, of a frame mounted on the upper side thereof and tapering upwardly to a central point above the aeroplane, a universal joint mounted in said frame at said central point, a vertically disposed rod extending through said universal joint and having a weight at its lower end, a horizontal stabilizing plane rigidly mounted on said rod above said joint, and a connection between the ends of said stabilizing plane and the aeroplane, said connection permitting free movement between said parts, whereby said weight and rod will automatically maintain said stabilizing plane in an approximately horizontal position.

In testimony whereof I affix my signature in the presence of two witnesses.

THOMAS A. F. YERNESS.

Witnesses:
J. C. DEVICE,
C. PAUL PARKER.